United States Patent
Wu et al.

(10) Patent No.: US 11,494,475 B2
(45) Date of Patent: Nov. 8, 2022

(54) SAFETY SYSTEM FOR CLEANROOM AND OPERATION METHOD THEREOF

(71) Applicant: United Semiconductor (Xiamen) Co., Ltd., Fujian (CN)

(72) Inventors: Chao Wu, Shamen (CN); Chung-Li Chien, Shamen (CN); Cheng-Tar Lu, Shamen (CN); Zi Xin Chen, Shamen (CN); Sheng Kai Wang, Shamen (CN); Wen Yi Tan, Xiamen (CN)

(73) Assignee: United Semiconductor (Xiamen) Co., Ltd., Fujian (CN)

( * ) Notice: Subject to any disclaimer, the term of this patent is extended or adjusted under 35 U.S.C. 154(b) by 353 days.

(21) Appl. No.: 16/842,750

(22) Filed: Apr. 7, 2020

(65) Prior Publication Data

US 2021/0279315 A1      Sep. 9, 2021

(30) Foreign Application Priority Data

Mar. 3, 2020    (CN) .......................... 202010137965.0

(51) Int. Cl.
*G06F 21/32*      (2013.01)
*G06F 21/35*      (2013.01)
*G06K 7/10*       (2006.01)

(52) U.S. Cl.
CPC .............. *G06F 21/32* (2013.01); *G06F 21/35* (2013.01); *G06K 7/10366* (2013.01)

(58) Field of Classification Search
None
See application file for complete search history.

(56) References Cited

U.S. PATENT DOCUMENTS

| | | | |
|---|---|---|---|
| 11,227,060 B1* | 1/2022 | John | G06F 21/606 |
| 2011/0227740 A1* | 9/2011 | Wohltjen | G01S 11/16 |
| | | | 340/686.6 |
| 2013/0278762 A1* | 10/2013 | Jiang | G06Q 10/06 |
| | | | 348/143 |

FOREIGN PATENT DOCUMENTS

| | | | | |
|---|---|---|---|---|
| CN | 1873577 A | 12/2006 | | |
| CN | 102747891 A | 10/2012 | | |
| CN | 202650103 U | 1/2013 | | |
| CN | 204215457 U | 3/2015 | | |
| CN | 105069310 A | 11/2015 | | |
| CN | 205302299 U | 6/2016 | | |
| CN | 108495092 A | * 9/2018 | ............. | G08B 21/00 |
| CN | 208782520 U | 4/2019 | | |

* cited by examiner

*Primary Examiner* — Nelson S. Giddins
(74) *Attorney, Agent, or Firm* — Winston Hsu (57) ABSTRACT

The invention provides a safety system for a cleanroom, which comprises a cleanroom garment provided with a plurality of RFID (radio frequency identification) tags, a face recognition device arranged at an entrance of the cleanroom, and a first RFID reader arranged beside at least one machine in the cleanroom, wherein the first RFID reader is used for identifying the RFID tags on the cleanroom garment, and a KVM network power interrupter connected to a display screen of the machine.

18 Claims, 6 Drawing Sheets

SAFETY SYSTEM FOR CLEANROOM AND OPERATION METHOD THEREOF

BACKGROUND OF THE INVENTION

1. Field of the Invention

The invention relates to a safety system, in particular to a safety system for a clean room.

2. Description of the Prior Art

With the economic development, clean rooms have been applied to various industries. Clean room technology has become an indispensable key technology in various fields such as industrial production, teaching research and medical pharmacy. Among them, because the clean room often involves the core technical secrets of each enterprise, each enterprise has always attached great importance to the data confidentiality of the clean room. Most enterprises have set up safety monitoring systems in their clean rooms, for example, there are identification device at the entrance and exit of the clean room, or there are a large number of cameras inside the clean room.

However, there is still room for improvement in the present clean room safety monitoring system. For example, it is one of the development goals in this field to further increase the correctness of personnel identification without increasing extra and excessive costs.

SUMMARY OF THE INVENTION

The invention provides a safety system for a cleanroom, which comprises a cleanroom garment provided with a plurality of RFID (radio frequency identification) tags, a face recognition device arranged at an entrance of the cleanroom, and a first RFID reader arranged beside at least one machine in the cleanroom, wherein the first RFID reader is used for identifying the RFID tags on the cleanroom garment, and a KVM network power interrupter connected to a display screen of the machine.

The present invention further provides a method of operating a safety system for a clean room, the method including: providing a safety system, the safety system at least comprises: a cleanroom garment equipped with a plurality of RFID (radio frequency identification) tags, a face recognition device installed at an entrance and an exit of a clean room, and a first RFID reader installed beside at least one machine in the clean room. When a person wears the cleanroom garment to enter the clean room, the safety system performs the following steps: (1) the face recognition device judges the data of the person, and according to the identified data of the person, the safety system grants the machine platform corresponding to the RFID tags of the cleanroom garment and links the cleanroom garment with the person; (2) when the person approaches the machine, the first RFID reader determines whether the RFID tag of the cleanroom garment conforms to the usage authority; and (3) If the first RFID reader determines that the usage authority of the RFID tag of the cleanroom garment is unqualified, a signal of a display screen of the machine will be cut off.

The present invention is characterized by providing an improved safety system for a clean room. The combination of RFID tags, RFID readers, KVM network power interrupters and other equipment allows personnel wearing cleanroom garment with RFID tags to be safely monitored by each RFID reader inside the clean room. Since the RFID identification technology has higher accuracy, lower cost and faster identification speed than human face identification system. Therefore, the safety in the clean room can be greatly improved under the condition of only increasing a small amount of cost.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the present invention to users skilled in the technology of the present invention, preferred embodiments are detailed as follows. The preferred embodiments of the present invention are illustrated in the accompanying drawings with numbered elements to clarify the contents and the effects to be achieved.

Please note that the figures are only for illustration and the figures may not be to scale. The scale may be further modified according to different design considerations. When referring to the words "up" or "down" that describe the relationship between components in the text, it is well known in the art and should be clearly understood that these words refer to relative positions that can be inverted to obtain a similar structure, and these structures should therefore not be precluded from the scope of the claims in the present invention.

Figure 1:
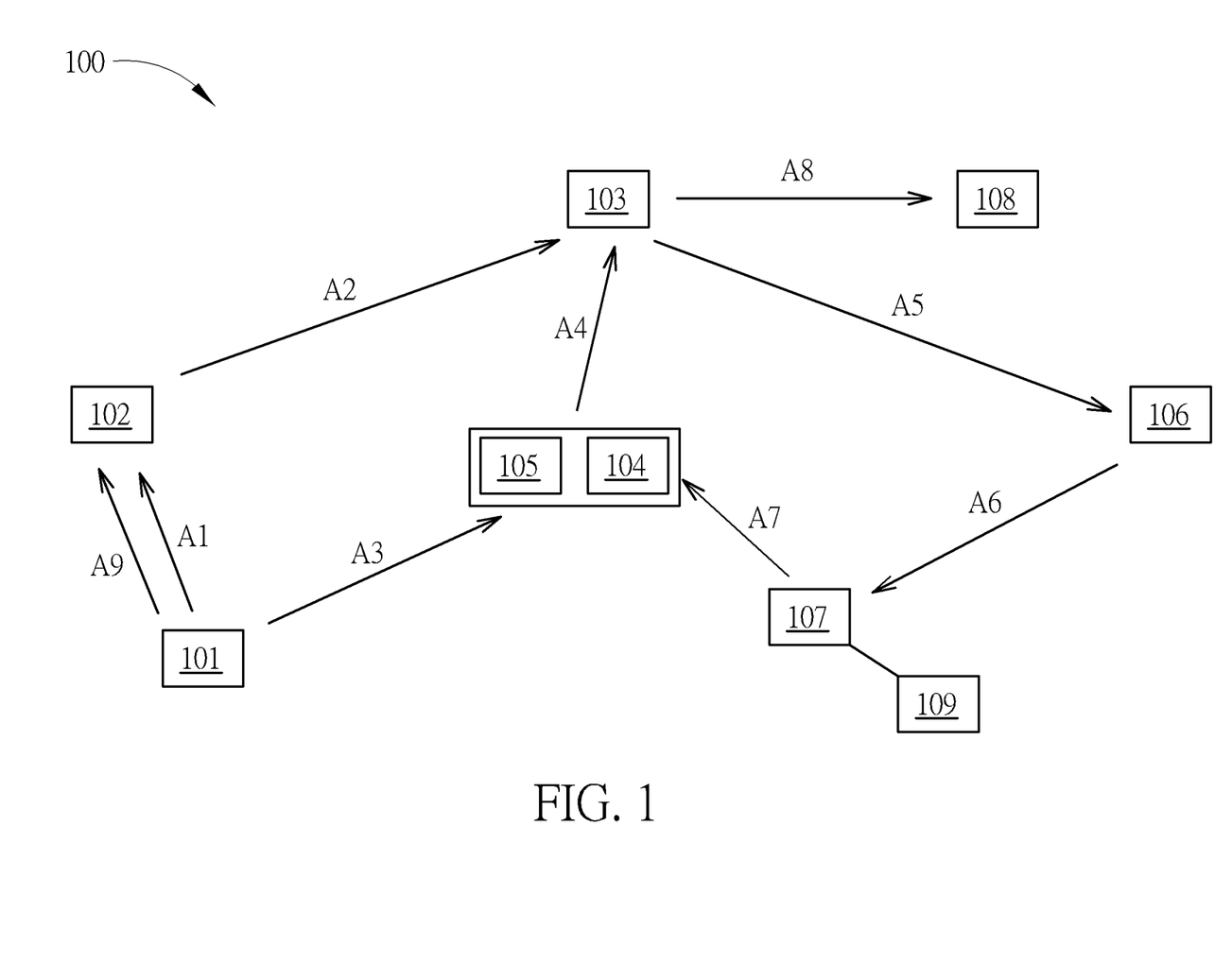
FIG. 1 shows a system schematic diagram of a safety system for a clean room according to the present invention.

Please refer to FIG. 1, which shows a system schematic diagram of the safety system for a clean room according to the present invention. In the following contents, the system for the safety system of the clean room of the present invention and its operation mode will be described. As shown in FIG. 1, the safety system 100 of the present invention includes a plurality of devices, and each device has a connection relationship. Please note that the "connection relationship" mentioned here may mean that two different devices are directly connected together, or the two devices are connected to each other by signal transmission relationships with each other.

In FIG. 1, each device or person is indicated in the box by reference numerals 101 to 109, and the relationships or behaviors among different devices/persons are indicated by arrows by behaviors A1 to A9. For the purpose of clear indication, each device/person 101 to 109 and behaviors/relationships A1 to A9 are listed as follows, and the following paragraphs will be described in more detail.

101: Personnel wearing cleanroom garment containing RFID (Radio Frequency Identification) tags;
102: Face recognition gate;
103: Face recognition and RFID system server;
104: Display screen;
105: RFID reader;
106: KVM network power interrupter;
107: Video divider;
108: CCTV system server;
109: Machine;
A1: Personnel wearing cleanroom garment containing RFID tags enter the face recognition gate;
A2: The face recognition gate links the RFID tag on the cleanroom garment with this person (the RFID tag will represent this person thereafter);
A3: Personnel wearing cleanroom garment containing RFID tags approach the RFID reader (installed beside the display screen);
A4: The RFID reader returns the identification data to the face identification and RFID system server;
A5: The face recognition and RFID system server judges that the person is not qualified, and sends a shutdown command to the KVM network power interrupter (if it judges that the person is qualified, steps A6 to A7 will not be performed);
A6: The KVM network power interrupter cuts off the power of the video divider;
A7: The signal of the video divider is interrupted, and there is no signal output from the display screen (the video divider is connected between the machine and the display screen);
A8: The RFID reader is linked to the CCTV system server, and the computer screen of the relevant guard personnel shows the picture of the camera near the machine 109; and
A9: People wearing cleanroom garment with RFID tags walk out of the face recognition gate, and the face recognition and RFID system server unlink the RFID tags on the cleanroom garment from the people.

Figure 2:
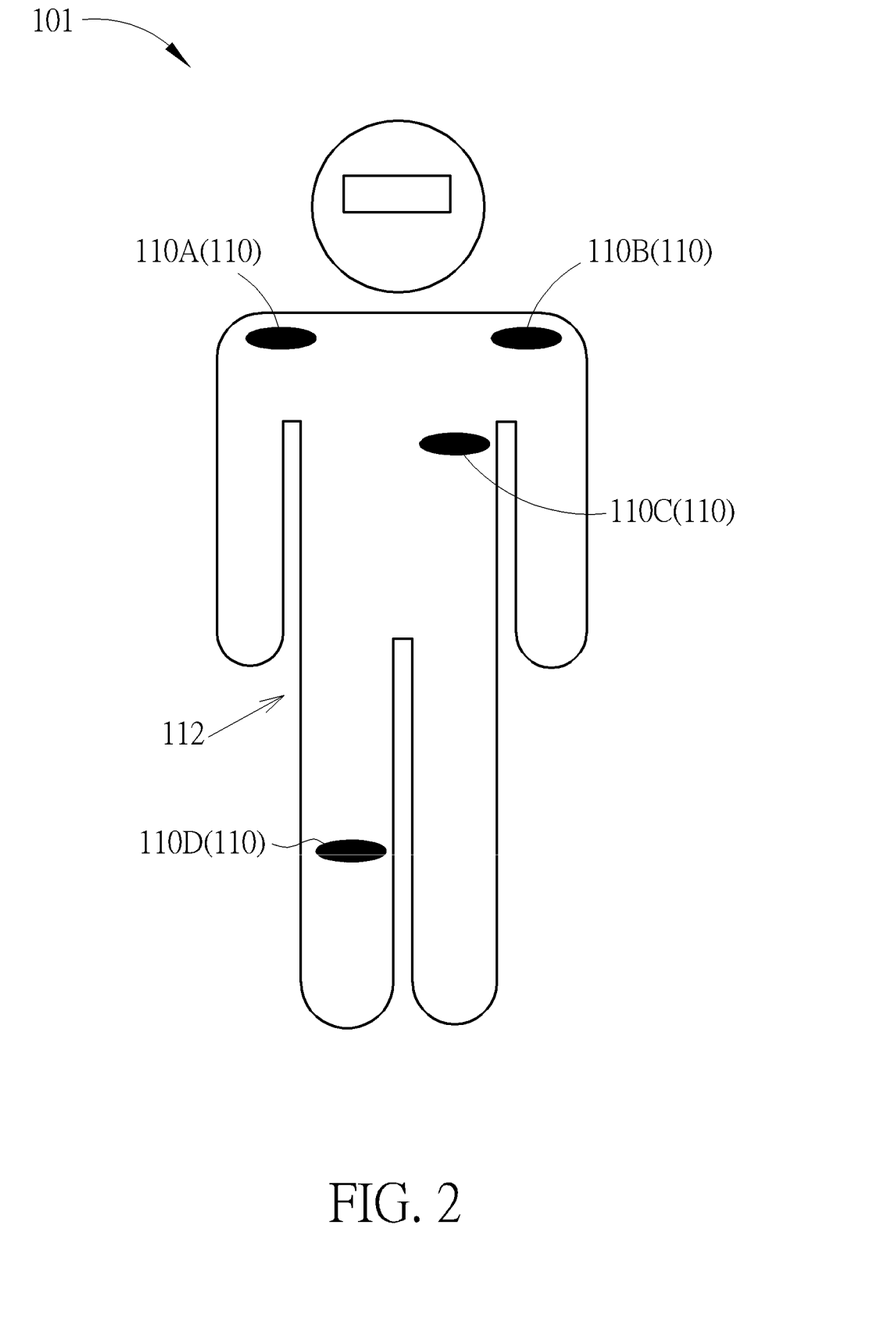
FIG. 2 is a schematic diagram showing the position of the RFID tag attached to the cleanroom garment in the present invention.

The safety system 100 provided by the present invention includes at least one cleanroom garment containing RFID (Radio Frequency Identification) tags. Please refer to FIG. 1 and FIG. 2 together, in which a person wearing cleanroom garment containing RFID tags is defined as 101. As shown in FIG. 2, a plurality of RFID tags 110 are disposed on a cleanroom garment 112. FIG. 2 is a schematic diagram showing the position of the RFID tag attached to the cleanroom garment in the present invention. Taking this embodiment as an example, a set of cleanroom garment 112 may include four RFID tags 110A, 110B, 110C, 110D, wherein two RFID tags 110A and 110B are respectively arranged at the left and right shoulders of the cleanroom garment 112, one RFID tag 110C is arranged at the chest of the cleanroom garment 112, and one RFID tag 110D is arranged at the knee of the cleanroom garment 112. Of course, it can be understood that the above is only one example of the present invention, and the present invention does not limit the number and location of RFID tags contained on cleanroom garment, that is, the number and location of RFID tags can be changed according to actual requirements.

Figure 3:
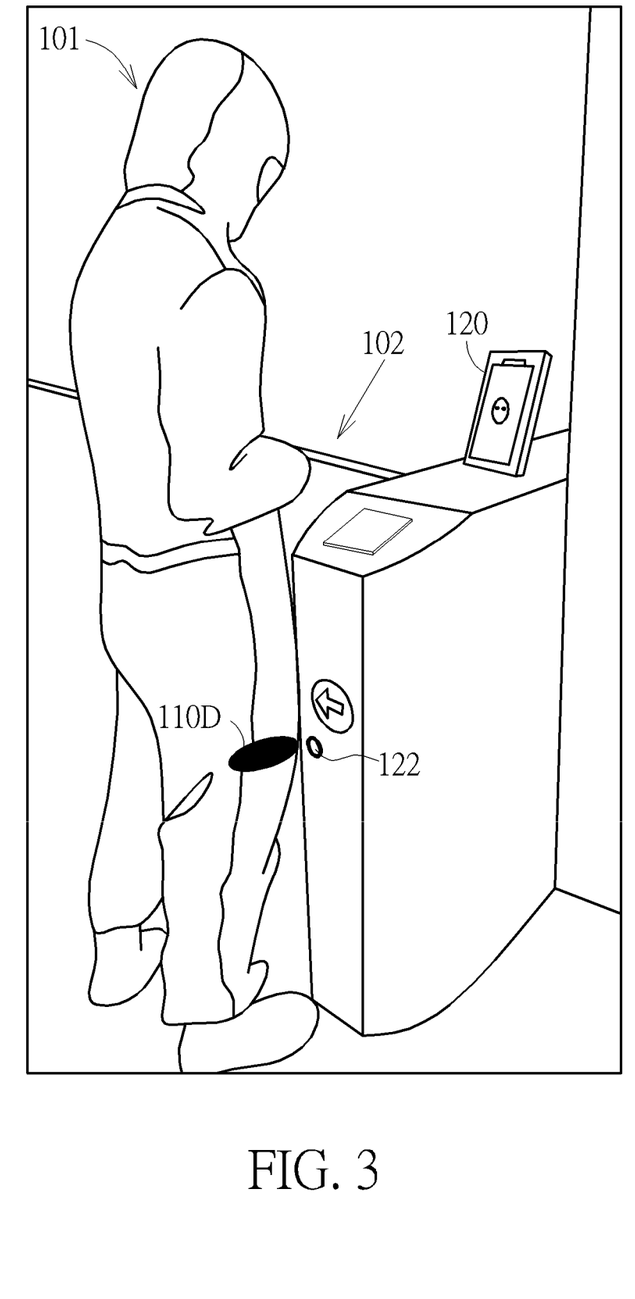
FIG. 3 is a schematic diagram showing a person passing through a face recognition gate in the present invention.

Please refer to FIG. 1 and FIG. 3, such as behavior/relation A1: a person 101 wearing cleanroom garment containing RFID (radio frequency identification) tags enters the face recognition gate 102. As shown in FIG. 3, FIG. 3 shows a schematic diagram of a person passing through a face recognition gate in the present invention. The face recognition gate 102 includes at least one face recognition device 120 and an RFID reader 122. The face recognition device 120 is used to recognize the face of the person 101, while the RFID reader 122 is used to recognize the RFID tag on the cleanroom garment 112 (for example, it is preferably used to recognize the RFID tag 110D at the knee), but is not limited thereto. The face recognition device 120 is, for example, a planar or stereoscopic camera, and is connected to the face recognition and RFID system server 103, wherein the face recognition and RFID system server 103 stores a plurality of personnel data, including the identities of the personnel allowed to enter the clean room, the authority of each personnel to use the machine, etc. While the RFID reader 122 can read the information or number of the RFID tag. Therefore, after the person 101 passes through the face recognition gate 102, the face recognition gate 102 will obtain two information: the identity of the person 101 (determined by recognizing the face information) and the information or number of the RFID tag 110D on the cleanroom garment 112 worn by the person 101. Next, the behavior/relation A2 is performed: the face recognition gate 102 links the person 101 to the RFID tag 110D on the cleanroom garment 112. More specifically, since the identity of the person 101 has been confirmed by the face recognition device 120, the face recognition and RFID system server 103 "grants" the rights (usage authority) possessed by the person 101 to the RFID tags 110A-110D on the cleanroom garment 112. Next, when the person 101 is in a clean room, the person 101 can be determined only by identifying the RFID tag.

It is worth noting that in this embodiment, it is not limited that a specific person can only wear a specific set of cleanroom garments. For example, some enterprises adopt a shift system, so there may be the possibility that many different personnel take turns to use the same cleanroom garment, or one person may wear different cleanroom garments every time he/she enters the clean room. One of the features of the present invention is that the identity of the person is determined by the face recognition device at the entrance and the exit of the clean room, and the person is linked with the RFID tag on the cleanroom garment. Therefore, when a person enters the clean room later, only the RFID tag needs to be determined, and the face recognition process does not need to be performed again. However, one of the advantages of the present invention is that the speed and accuracy of RFID tags are higher than face recognition, and the cost is lower.

Next, please continue to refer to FIG. 1. In the clean room of this embodiment, there is at least one machine 109. An RFID reader 105 is disposed beside the machine 109. In addition, in this embodiment, the machine 109 is connected to a video divider 107, which is connected to a KVM network power interrupter 106 (also known as a KVM switch, which in this embodiment has a switch-like function) and a display screen 104. In other words, in this embodiment, the video divider 107 can be controlled by the KVM network power interrupter 106 to cut off the power supply of the display screen 104. However, it is worth noting that since the power supply of the display screen 104 of the machine 109 is separated by the video divider 107, the machine 109 will not stop operating even if the power supply of the machine display screen 104 is turned off, that is to say, the machine 109 can still operate normally (to avoid interruption of the processing performed by the machine).

Figure 4:
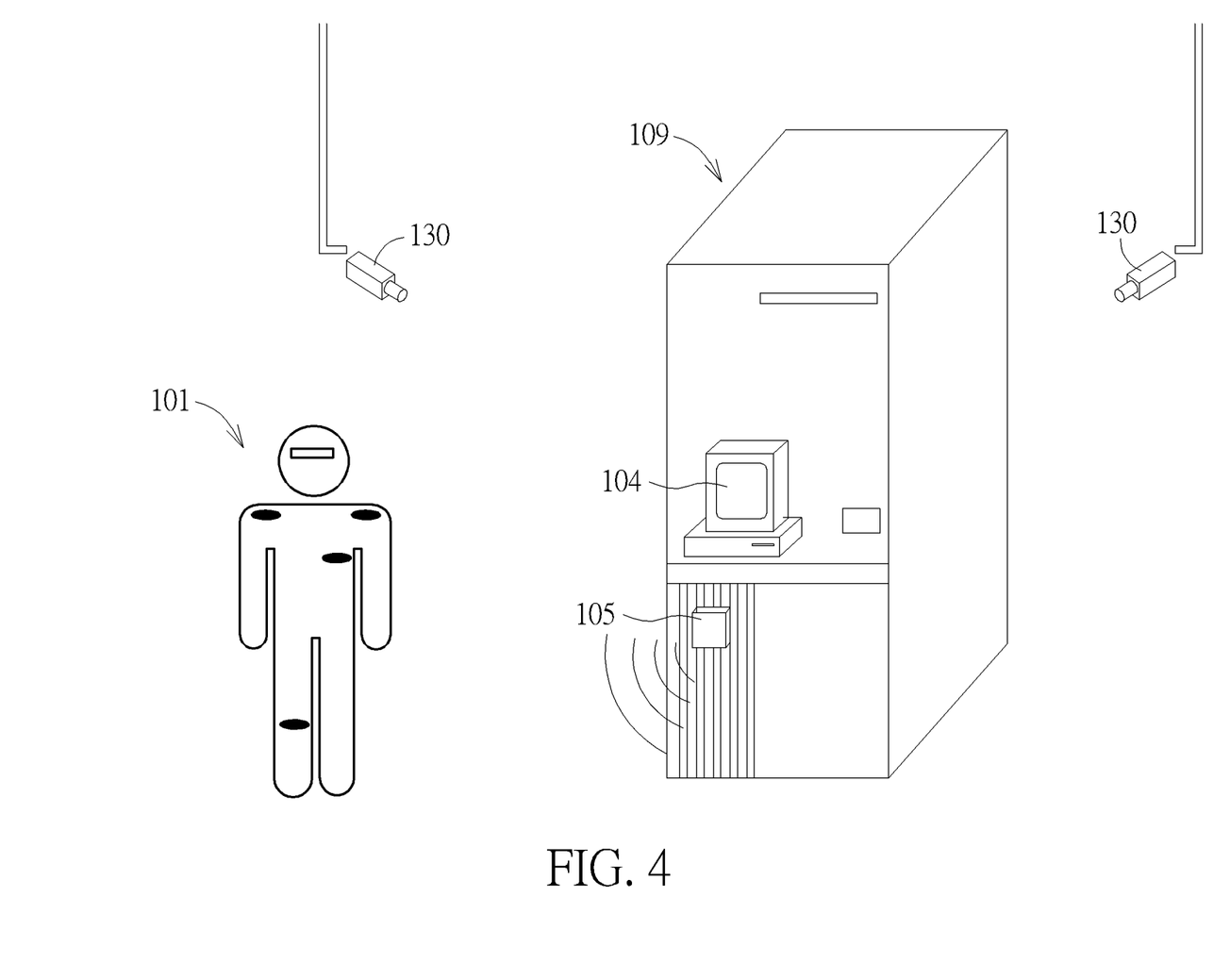
FIG. 4 is a schematic diagram showing a person approaching a machine in the present invention.

FIG. 4 is a schematic diagram showing a person approaching a machine in the present invention. As shown in FIG. 1 and FIG. 4, the behavior/relation A3 is performed: the person 101 wearing the cleanroom garment 112 containing RFID tags approaches the RFID reader 105 (installed beside the display screen 104). In other words, when the person 101 approaches the machine 109 in the clean room, the RFID reader 105 beside the machine 109 reads the RFID tag (e.g., the RFID tag 110C at the chest) of the cleanroom garment 112 on the person 101. Then the behavior/relation A4 is performed: the RFID reader 105 returns the identification data of person 101 to the face identification and RFID system server 103. Afterwards, the behavior/relation A5 is performed: the face recognition and RFID system server 103 determines that the person 101 is a non-qualified person, and sends a shutdown command to the KVM network power interrupter 106 (if the person is determined to be a qualified person, the steps A6 to A7 are not performed); Next, the behavior/relation A6 is performed: the KVM network power interrupter 106 cuts off the power of the video divider 107; and the behavior/relation A7 is performed: the signal of the video divider 107 is interrupted, and the display screen 104 has no signal output (the video divider 107 is connected between the machine 109 and the display screen 104).

In addition, in this embodiment, in order to prevent the system from misjudging, for example, sometimes a person may only pass by a certain machine while the system determines that the person is not qualified and turns off the display screen, it can be set that the RFID reader starts to make the determination when the person 101 approaches the machine within a certain distance and lasts for more than a certain time. For example, the system can be set such that the RFID reader 105 starts to recognize the identity of the person 101 when the person 101 approaches the machine 109 within one meter and lasts for more than 15 seconds to prevent the display screen from being turned off by mistake. It is understood that the above-mentioned specific distance and specific time can be adjusted according to actual requirements, and the present invention is not limited thereto.

In addition, when the face recognition and RFID system server 103 determines that the person 101 is an unqualified person, in addition to sending an instruction to the KVM network power interrupter 106 to shut down the display screen 104, the behavior/relationship A8 can also be performed simultaneously: the RFID reader 105 is linked with a CCTV system server 108, and the computer screen of the relevant guard personnel shows the picture of the camera near the machine 109. In more detail, the RFID reader 105 is connected to the face recognition and RFID system server 103, and the face recognition and RFID system server 103 can be further connected to a CCTV system server 108, the face recognition and RFID system server 103 can send instructions to control the CCTV system server 108, and can turn on a specific camera in the clean room, such as the camera 130 (refer to FIG. 4) located near the machine 109, so as to facilitate monitoring the movement of unqualified personnel and inform relevant personnel (such as guard) in time.

Figure 5:
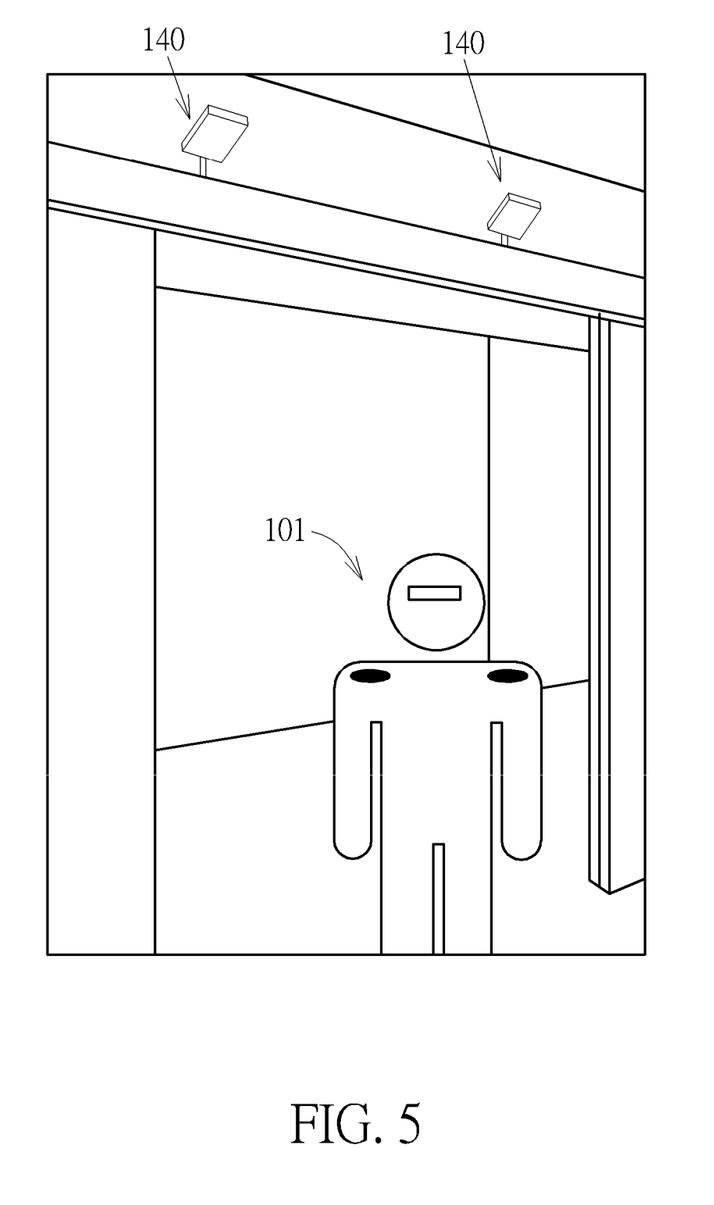
FIG. 5 is a schematic diagram showing a person passing through other RFID readers arranged in a clean room in the present invention.
Figure 6:
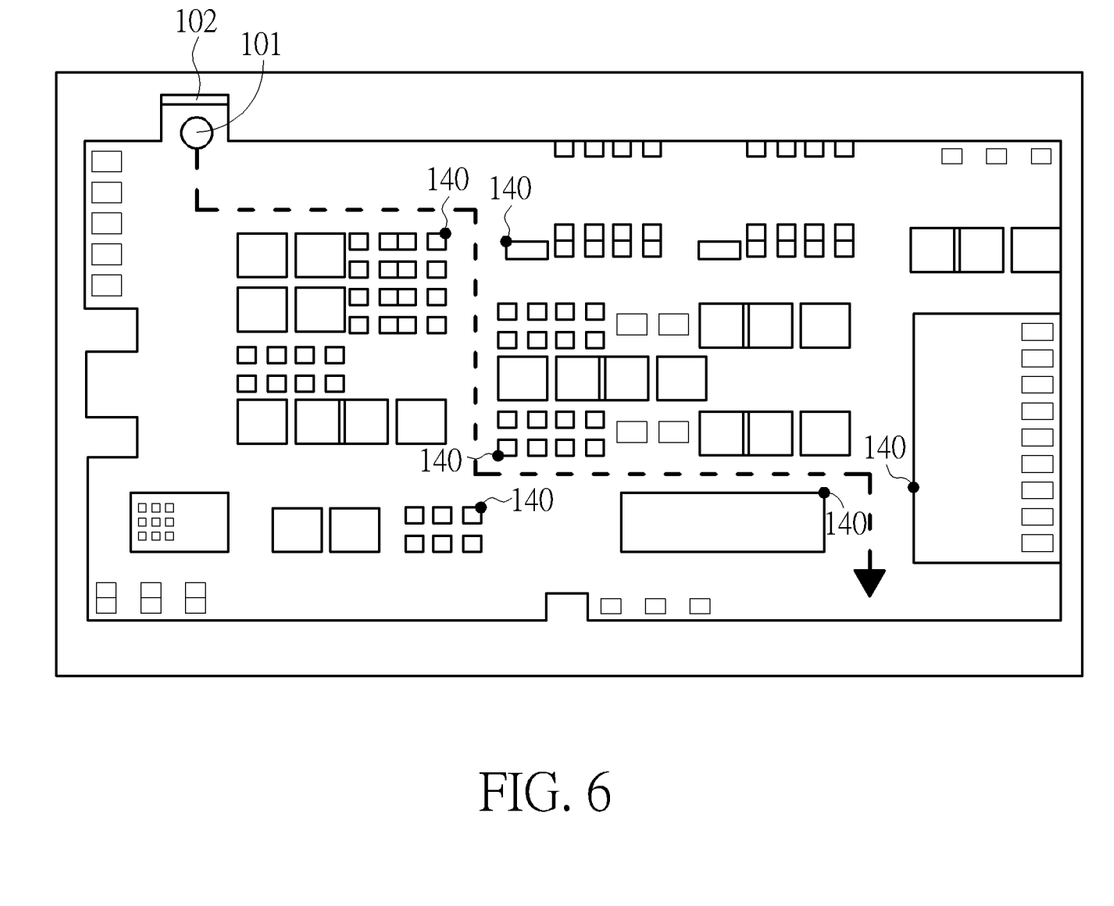
FIG. 6 is a diagram showing the track of a person walking in a clean room recorded by a face recognition and RFID system server.

FIG. 5 is a schematic diagram showing a person passing through other RFID readers arranged in a clean room in the present invention. FIG. 6 is a diagram showing the track of a person walking in a clean room recorded by a face recognition and RFID system server. In this embodiment, referring to FIG. 5 and FIG. 6, in addition to the RFID reader 105 arranged beside each machine 109, other RFID readers can also be arranged at some walkways, corners, door frames and other positions in the clean room to facilitate tracking the walking route in the clean room. For example, in FIG. 5, an RFID reader 140 may be disposed on a door frame to sense RFID tags (e.g., RFID tags 110A, 110B on shoulders) on the cleanroom garment 112 worn by the person 101. Moreover, the sensing result can be transmitted back to the face recognition and RFID system server 103 and recorded into a walking trajectory diagram similar to FIG. 6.

After that, when the person 101 leaves the clean room, the behavior/relation A9 is performed: the person 101 wearing the cleanroom garment 112 containing the RFID tag 110 walks out of the face recognition gate 102, and the face recognition and RFID system server 103 unlinks the RFID tag 110 on the cleanroom garment 112 from the person 101. That is, the cleanroom garment 112 can be reused by other personnel afterwards.

Therefore, referring to FIGS. 1 to 6, the present invention provides a safety system 100 for a clean room, which includes a cleanroom garment 112 equipped with a plurality of RFID (radio frequency identification) tags 110, a face recognition device 120 installed at an entrance of a clean room, a first RFID reader 105 installed beside at least one machine 109 in the clean room. The first RFID reader 105 is used to identify the RFID tags 110 on the cleanroom garment 112 and a KVM network power interrupter 106 is connected to a display screen 104 of the machine 109.

The present invention also provides a method for operating a safety system for a clean room, which includes providing a safety system 100, the safety system at least includes: a cleanroom garment 112 equipped with a plurality of RFID (radio frequency identification) tags 110, a face recognition device 120 installed at the entrance of a clean room, and a first RFID reader 105 installed beside at least one machine 109 in the clean room. When a person 101 enters the clean room wearing the cleanroom garment 112, the safety system 100 performs the following steps: (1) the face recognition device 120 determines the data of the person, and according to the identified data of the person, the safety system grants the machine usage authority corresponding to the RFID tags 110 of the cleanroom garment 112, and links the cleanroom garment 112 with the person 101; (2) when the person 101 approaches the machine 109, the first RFID reader 105 determines whether the RFID tag 110 of the cleanroom garment 112 conforms to the usage authority; and (3) if the first RFID reader 105 determines that the usage right of the RFID tag 110 of the cleanroom garment 112 is unqualified, the signal of a display screen 104 of the machine 109 will be cut off.

The present invention is characterized by providing an improved safety system for a clean room. The combination of RFID tags, RFID readers, KVM network power interrupters and other equipment allows personnel wearing cleanroom garment with RFID tags to be safely monitored by each RFID reader inside the clean room. Since the RFID identification technology has higher accuracy, lower cost and faster identification speed than human face identification system. Therefore, the safety in the clean room can be greatly improved under the condition of only increasing a small amount of cost.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of operating a safety system for a clean room, comprising:

providing a safety system, the safety system at least comprises: a cleanroom garment equipped with a plurality of RFID (radio frequency identification) tags;
a face recognition device installed at an entrance and an exit of a clean room; and
a first RFID reader installed beside at least one machine in the clean room;
wherein when a person wears the cleanroom garment to enter the clean room, the safety system performs the following steps:
(1) the face recognition device judges the data of the person, and according to the identified data of the person, the safety system grants the machine platform corresponding to the RFID tags of the cleanroom garment and links the cleanroom garment with the person;
(2) when the person approaches the machine, the first RFID reader determines whether the RFID tag of the cleanroom garment conforms to the usage authority; and
(3) If the first RFID reader determines that the usage authority of the RFID tag of the cleanroom garment is unqualified, a signal of a display screen of the machine will be cut off.

2. The operation method of the safety system according to claim 1, wherein the method of cutting off the signal of the display screen of the machine comprises connecting the display screen to a KVM (keyboard, video, mouse) network power interrupter, and the first RFID reader sends a signal to the KVM network power interrupter.

3. The operation method of the safety system according to claim 1, wherein after the signal of the display screen of the machine is cut off, the other functions of the machine except the display screen are still normal.

4. The operation method of the safety system according to claim 1, further comprising the face recognition and RFID system server connected to the face recognition device, the face recognition and RFID system server storing a plurality of personnel data and authority records.

5. The operation method of the safety system according to claim 4, wherein after the first RFID reader determines that the usage authority of the RFID tag of the cleanroom garment is unqualified, the first RFID reader sends an alarm signal to the face recognition and RFID system server.

6. The operation method of the safety system according to claim 5, wherein after the face recognition and RFID system server receives the warning signal from the first RFID reader, the face recognition and RFID system server sends a signal to a CCTV (closed-circuit television) system server and controls a plurality of cameras in the clean room.

7. The operation method of the safety system according to claim 1, wherein after the person approaches the machine, the distance between the person and the machine is less than a set distance, and after the person is near the machine for more than a set time, the first RFID reader starts to sense the RFID tags of the cleanroom garment worn by the person.

8. The operation method of the safety system according to claim 7, wherein the set distance is less than 1 meter.

9. The operation method of the safety system according to claim 7, wherein the setting time is greater than 15 seconds.

10. The operation method of the safety system according to claim 1, wherein after the person leaves the clean room, the face recognition device unlinks the person from the cleanroom garment through the face recognition device.

11. The operation method of the safety system according to claim 1, further comprising a plurality of second RFID readers arranged beside a plurality of walkways in the clean room.

12. The operation method of the safety system according to claim 1, further comprising at least one third RFID reader disposed below the face recognition device.

13. The operation method of the safety system according to claim 1, wherein the plurality of RFID tags are installed at both shoulders, chest and knees of the cleanroom garment.

14. A safety system for a clean room, comprising:
a cleanroom garment equipped with a plurality of RFID (radio frequency identification) tags;
a face recognition device installed at an entrance and an exit of a clean room, wherein the face recognition device is used to link a person and the RFID tags and grant the RFID tags usage authority;
a first RFID reader installed beside at least one machine in the clean room, wherein the first RFID reader is used for identifying the RFID tags on the cleanroom garment; and
a KVM (keyboard, video, mouse) network power interrupter is connected to a display screen of the machine.

15. The safety system according to claim 14, wherein the KVM network power interrupter is used to cut off the power of the display screen of the machine.

16. The safety system according to claim 14, further comprising a face recognition and RFID system server connected to the face recognition device, wherein a plurality of personnel data and authority records are stored in the face recognition and RFID system server.

17. The safety system according to claim 14, further comprising a plurality of second RFID readers arranged beside a plurality of walkways in the clean room, wherein the second RFID readers are used for identifying the RFID tags on the cleanroom garment.

18. The safety system according to claim 14, further comprising a plurality of third RFID readers disposed below the face recognition device, wherein the third RFID readers are used to recognize the RFID tags on the cleanroom garment.

* * * * *